United States Patent
Sprenger et al.

[19]

[11] Patent Number: 6,055,996
[45] Date of Patent: May 2, 2000

[54] APPARATUS FOR WASHING DISHES AND CUTLERY ESPECIALLY IN A FOOD SERVICE SYSTEM IN AN AIRCRAFT

[75] Inventors: Wilfried Sprenger, Issendorf; Jens Harten, Hamburg; Bernd Roessner, Rosengarten, all of Germany

[73] Assignee: DaimlerChrysler Aerospace Airbus GmbH, Hamburg, Germany

[21] Appl. No.: 08/936,308

[22] Filed: Sep. 24, 1997

[30] Foreign Application Priority Data

Sep. 24, 1996 [DE] Germany .................. 196 39 123

[51] Int. Cl.[7] ...................................................... B08B 3/00
[52] U.S. Cl. ........................... 134/133; 134/59; 134/137; 134/85; 134/92; 134/45
[58] Field of Search .................. 134/45, 59, 104.3, 134/102.3, 104.4, 115 R, 133, 168 R, 172, 183, 199, 85, 92, 137, 143, 154

[56] References Cited

U.S. PATENT DOCUMENTS

| | | | |
|---|---|---|---|
| 2,216,388 | 10/1940 | Hampel | 134/57 D |
| 2,690,949 | 10/1954 | Reifenberg . | |
| 2,814,809 | 12/1957 | Boyle . | |
| 2,939,465 | 6/1960 | Kesling | 134/182 |
| 5,107,880 | 4/1992 | Pierson | 134/902 |
| 5,496,000 | 3/1996 | Mueller . | |
| 5,524,358 | 6/1996 | Matz | 34/275 |
| 5,755,244 | 5/1998 | Sargeant et al. | 134/46 |
| 5,787,911 | 8/1998 | Jacobus et al. | 134/201 |

FOREIGN PATENT DOCUMENTS

| | | |
|---|---|---|
| 3828035 | 2/1990 | Germany . |
| 4215614 | 11/1993 | Germany . |
| 4302706 | 8/1994 | Germany . |
| 4330395 | 3/1995 | Germany . |
| WO 96/01584 | 1/1996 | WIPO . |

*Primary Examiner*—Frankie L. Stinson
*Assistant Examiner*—Paul J. Lee
*Attorney, Agent, or Firm*—W. F. Fasse; W. G. Fasse

[57] ABSTRACT

In order to reuse dishes, cutlery, glassware and other food service utensils onboard an aircraft, a washing apparatus is provided as a part of the food service system onboard the aircraft. The apparatus includes a service trolley and a washing unit that may be coupled together to form a washing chamber within the trolley. The washing unit is installed within a trolley parking bay in a galley of the aircraft and is connected to a water supply and a power supply. The trolley is equipped with racks for receiving the dirty utensils, and the washing unit is equipped with water spray arms that reach into the trolley into clearance spaces between the racks. The dirty utensils are collected from passengers directly into the service trolley, which is then wheeled into position in the trolley parking bay, and coupled to the washing unit. Thereby, the utensils may be collected, cleaned, stored, and reused, with only minimal handling, cost, and space requirements.

20 Claims, 2 Drawing Sheets

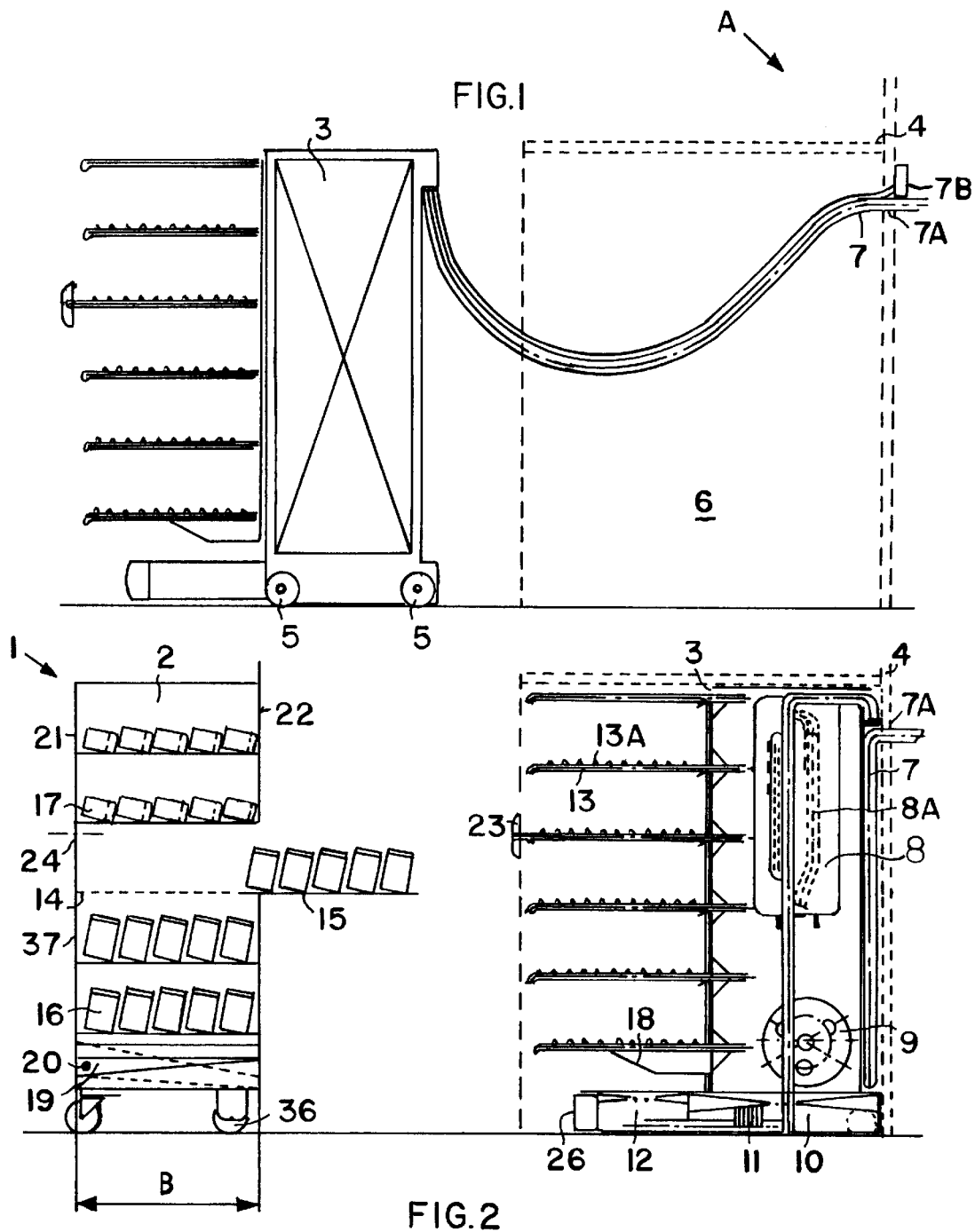

APPARATUS FOR WASHING DISHES AND CUTLERY ESPECIALLY IN A FOOD SERVICE SYSTEM IN AN AIRCRAFT

FIELD OF THE INVENTION

The invention relates to an apparatus for cleaning or particularly washing dishes and cutlery, and especially drinking cups and glasses, in a food service system in an aircraft or the like, in which a food serving trolley carries the dirty dishes and cutlery and can be coupled to a washing unit that is connected to a water supply and a power supply for carrying out the washing process.

BACKGROUND INFORMATION

During commercial aircraft flights, meals and beverages are typically offered to the passengers at various times during the flight. For example, German Patent Laying-Open Publication 4,302,706 and corresponding U.S. Pat. No. 5,496,000 (Mueller) disclose a passenger meal service system in which previously prepared and individually portioned meals are stored and then served to the passengers in individual menu service boxes at specified meal times. In contrast, various beverages are offered and served to the passengers as and whenever requested by the passengers. As a result, the number of drinking glasses and cups required during a flight is relatively high, and a corresponding supply of drinking glasses and cups must be kept onboard the aircraft.

Recently, the drinking cups and glasses used onboard aircraft have been disposable or recyclable, but in order to reduce the quantity of garbage, waste or recycling needs, and corresponding storage space onboard the aircraft, efforts are being made to use dishes and cutlery and particularly drinking glasses and cups onboard aircraft, especially during long distance flights. However, since the passengers are served beverages several times during a long flight, a great number of glasses and cups are required, and it is very costly and uneconomical, for logistic and space reasons, to provide reusable cups and glasses that are only used once during a flight and then need to be stored for later cleaning.

For the above reason, it would be desirable to provide an apparatus that cleans or washes the used cups and glasses and other dishes and cutlery onboard the aircraft, so that they may be reused for another meal or beverage service during the same flight. Previously, the use of automatic dish washing machines onboard aircraft has been avoided, because compact and economical apparatus of this type were not available, and because the additional handling and further work effort needed for carrying out such cleaning of the dishes would be very great. For example, each individual item of cutlery, dishes and glassware would have to be removed from the passenger service trays, sorted, loaded into a dish washing machine, removed from the dish washing machine after the washing process, and then again sorted into passenger service trays in passenger service trolleys or the like. Such a procedure would be very costly and time consuming in terms of the time and handling effort required of the flight attendant crew and also the space that must be provided for the washing machines and for carrying out the various steps of the process. German Patent Laying-Open Publication 4,215,614 describes a method and an apparatus for cleaning food service trolleys or carts that are used for transporting food service trays or the like. In order to clean the trolleys, the trays are first removed therefrom, and the trolleys are pushed into a washing chamber equipped with a closeable door, water spray nozzles, a recirculating pump, filters, hot air nozzles, and the like. The trolleys rotate on a platform so that cleaning water jets and then drying air jets can be sprayed into the open side of the trolleys. Also disclosed is a special semicircular wheeled rack for carrying food service trays, so that the rack, loaded with trays, can be wheeled into the washing chamber in order to wash the trays. Disadvantageously, separate manual operations are necessary for removing the trays from the food service trolleys, loading the trays into the washing racks, and separately washing the trolleys and the trays. In other words, cleaning the inside of the trolleys is a separate procedure from cleaning the food service trays that are normally stored in the food service trolleys.

German Patent Laying-Open Publication 3,828,035 describes a method and an apparatus for cleaning food service trolleys and the like, in which the trolleys are loaded onto a conveyor belt which moves the trolleys through various pre-washing, washing, rinsing, and drying stations. Disadvantageously, the known system requires a large amount of floor space and has a high total weight, and also requires a great capital investment, so that the installation and use of such a system in an aircraft is not feasible.

International PCT Publication WO 96/01584 describes a method of preparing and distributing individually portioned meals, as well as a basket and a cutlery holder for carrying out the method. The known method involves bringing dirty dishes and cutlery from an aircraft to a central station at an airport, where the dishes and cutlery are sorted, placed into baskets, sent to an industrial dishwasher where the dishes and cutlery are cleaned, and then returned to a flight kitchen station where meals are prepared using the cleaned dishes and cutlery, whereupon the prepared meals are packed into service trolleys which are then transported to and stored in the aircraft, to be served to passengers in flight.

German Patent Laying-Open Publication 4,330,395 describes a washing machine, and especially a dish washing machine, which includes a used-water tank for storing the used wash water to later be secondarily used for flushing toilets or the like.

SUMMARY OF THE INVENTION

In view of the above it is an object of the invention to provide an apparatus for washing dishes and cutlery especially in a food service system in an aircraft, which makes it possible to use reusable dishes and cutlery and particularly drinking glasses and cups, with a minimum handling effort and storage space needed for cleaning, storing and reusing the dishes and cutlery. Further objects of the invention are to avoid or overcome the disadvantages of the prior art, and to achieve additional advantages apparent from the present description.

The above objects have been achieved in an apparatus or system for cleaning food service utensils in a food service system in an aircraft according to the invention. As used herein, the phrase food service utensils refers to and includes dishes, cutlery, drinking glasses, cups, trays, tray covers and other reusable utensil items used for serving meals or beverages on board the aircraft. Reference to any particular type of utensil in the present description generally also applies to any other type of utensil.

The apparatus of the invention includes a standard-sized service trolley having at least one open or openable side, and a washing unit that is installed in a trolley parking bay or space in an onboard galley in an aircraft. The washing unit is connected to a water supply and a power supply, and for example includes washing spray nozzles, a water collecting basin, a water tank, a circulating pump, a water heater, and the like. The service trolley receives the dirty dishes and cutlery, or especially drinking glasses and cups therein, and is docked into or coupled to the washing unit for carrying out the washing process. In this docked or coupled condition, the trolley and the washing unit together form a single common washing chamber within the trolley, whereby the need for a separate closable washing chamber is avoided, and whereby only the interior of the trolley and the items loaded therein are washed so that the necessary amount of wash water is minimized.

According to particular details of the invention, a seal is provided between the open side of the trolley and a complementary surface of the washing unit, so that the two components may be locked together in a sealed manner to form the washing chamber. The washing unit preferably includes horizontally extending spray arms that reach into the interior of the service trolley when the trolley is docked or coupled to the washing unit. The interior of the trolley may be equipped with washing baskets or racks that receive the dirty dishes and cutlery and are slidable into and out of the open side of the trolley. A liquid collecting basin may be provided near the bottom of the trolley to collect any spills or remaining amounts of beverages that run out of the glasses and cups that are placed into the racks. The basin is tiltable so that it drains the collected liquid once the service trolley is coupled or docked onto the washing unit. The used wash water may be conveyed to a drain system of the aircraft to be drained overboard, or may be used as flush water for the onboard toilets.

BRIEF DESCRIPTION OF THE DRAWINGS

In order that the invention may be clearly understood, it will now be described, by way of example, with reference to the accompanying drawings, wherein:

FIG. 1 is a schematic side view of a washing unit as a component of a dish washing apparatus, ready to be positioned in a trolley parking bay in an aircraft;

FIG. 2 is a schematic sectional side view of the washing unit positioned in the trolley parking bay, and a service trolley as another component of the dish washing apparatus, ready to be coupled with the washing unit.

Figure 3:
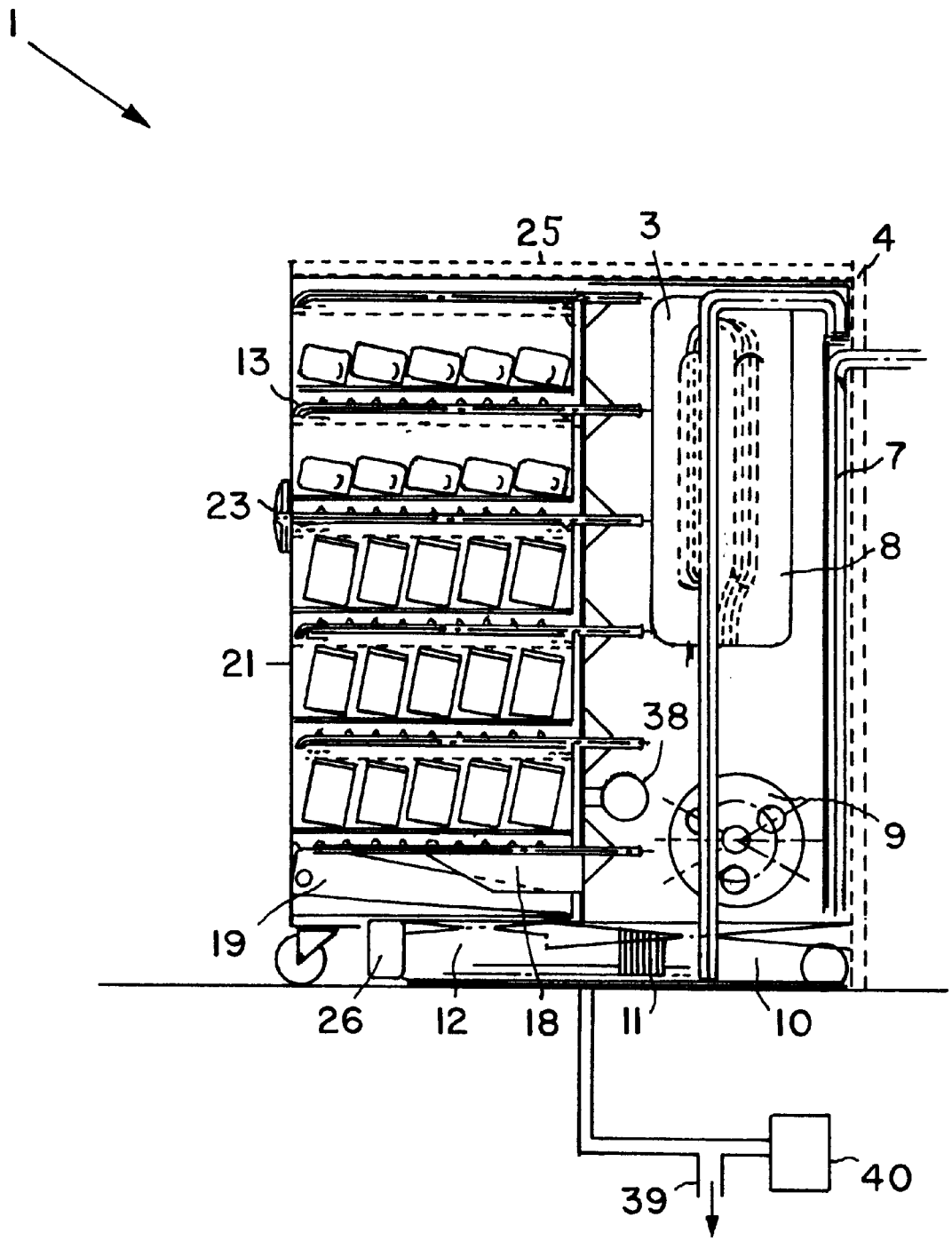
FIG. 3 is a schematic sectional side view of the service trolley coupled to the washing unit to form the complete dish washing apparatus.

DETAILED DESCRIPTION OF PREFERRED EXAMPLE EMBODIMENTS AND OF THE BEST MODE OF THE INVENTION

Referring generally to FIGS. 1 to 3, an example embodiment of a dish washing apparatus 1 according to the invention essentially includes a service trolley 2 and a washing unit 3. In the preferred embodiment, the dish washing apparatus 1 is dimensioned and adapted for use in a passenger meal and beverage service system onboard an aircraft. Thus, the service trolley 2 has the standard dimensions of typical onboard service trolleys, and the washing unit 3 has dimensions, or specifically at least a width and a height, to match the dimensions of a standard trolley or trolley parking bay. A galley 4 of the aircraft A has a plurality of trolley parking spots or bays 6 in which the trolleys 2 may be parked, stored, and secured during the flight. The galley 4 and a representative trolley parking bay 6 are merely shown schematically by dashed lines. Since the trolley 2 and the trolley parking bay 6 have the same outer dimensions and configurations as conventional air service trolleys and parking bays, the present apparatus may be readily and economically retrofitted in existing aircraft, as well as being provided in new aircraft construction.

FIG. 1 shows the washing unit 3, as a component of the dish washing apparatus 1, in a position in the galley 4 in front of a respective trolley parking bay 6. The washing unit 3 is with wheels or rollers 5 so that it may be rolled into the trolley parking bay 6. However, first the washing unit 3 is connected to a fresh water supply and water drain 7A, as well as a power supply 7B, which have been provided in the parking bay 6. In the illustrated position of the washing unit 3 in front of the parking bay 6, it is clear that the flexible water supply and drain hoses 7 and power supply cord are long enough to allow the washing unit 3 to be pushed into and pulled out of the parking bay 6 without problems. Thus, connection, installation and any necessary maintenance of the washing unit 3 may be easily carried out, perhaps without even needing to disconnect the water hoses, and for example an operational test can be carried out before final installation of the washing unit 3 in the parking bay 6. Once the washing unit 3 is rolled into the parking bay 6 on the rollers 5, the washing unit 3 is then locked or fixed in its final operating position, preferably on the floor or on the wall of the galley 4, in any manner that would be apparent to a person skilled in this art.

FIG. 2 shows the dish washing apparatus 1 including the service trolley 2 and the washing unit 3 as components thereof, in a cross-sectional view. The washing unit 3 has been pushed into and locked in its proper operating position in the trolley parking bay 6 in the galley 4. The trolley 2 has been wheeled on its wheels 36 into the galley 4, and is at a position in front of the washing unit 3, i.e. has not yet been pushed into the parking bay 6 to couple or mate with the washing unit 3.

As seen in this sectional view of FIG. 2, the washing unit 3 includes a water tank 8, optionally with heating coils 8A arranged therein, and a water pump 9 provided in a substantially vertically extending rear or back portion of the washing unit 3. Also arranged in this back portion of the washing unit 3, but not shown in detail, are other typical components of washing machines, such as an electronic control unit, water control valves, a detergent or cleaning solution dosing arrangement, a fresh water preparation unit, etc. In the horizontally extending bottom portion of the washing unit 3, the washing unit includes a water tank 10, which may be provided with a heater, a water filter 11, and a remaining liquid collecting tank 12. A detergent or washing solution cartridge 26 is mounted on the front side of the liquid collecting tank 12 for easy accessibility, i.e. so that the cartridge 26 may be easily exchanged as needed. This cartridge 26 provides a properly dosed amount of detergent or washing solution into the wash water during the wash cycle.

Extending forward in a horizontal direction from the vertically extending back portion of the washing unit 3 are six spray arms 13 respectively equipped with a plurality of water jet nozzles 13A. These nozzles 13A may be stationary fixed nozzles, oscillating nozzles, rotating nozzles, or the like, or may be represented by one or more rotating spray arms mounted on each spray arm 13. The length of each spray arm 13 substantially corresponds to the width or depth B of the service trolley 2, because the spray arms 13 will reach into the service trolley 2 as de scribed below.

Since the washing unit 3 occupies nearly half of the depth of the trolley parking bay 6, it is necessary to provide a deeper than usual parking bay 6, or to use a standard half-sized trolley 2.

The present embodiment uses a half-sized trolley 2. The inside of the service trolley 2 is equipped with washing baskets or racks 15 slidably arranged on sliding rails 14 so as to receive dirty dishes and cutlery therein. In the illustrated example embodiment, drinking glasses 16 and cups 17 have been placed in the racks 15, which are especially provided with slanted portions, for example slanted at about 10°, to receive the glasses and cups so that water will run off and not puddle on the glasses and cups. In further embodiments, the racks 15 are particularly configured to receive cutlery, plates, bowls, or even service trays, so that all service items used in the passenger meal and beverage service can be washed.

Since the trolley 2 has the standard dimensions and configuration of a half-sized flight service trolley, and is equipped with wheels 36, it may be conveniently pushed along the aisles of the aircraft to collect the used drinking glasses and cups from the passengers. Thus, a flight attendant may immediately and directly load the racks 15 while collecting the dirty drinking glasses and cups from the passengers, whereby no extra work is required for loading the dish washing apparatus. The racks 15 can be pulled out of the opening provided on at least one side 22 of the trolley 2 on the slide rails 14, so that it is very convenient for the flight attendants to place the cups and glasses on the racks 15. It is preferable that the racks 15 are secured by an end stop of any known configuration, so that the rails 15 cannot be accidentally completely pulled out of the slide rails 14 and thus fall down.

Between the respectively vertically adjacent racks 15, a sufficient clearance space is provided so that the spray arms 13 can reach into such clearance spaces without obstruction when the service trolley 2 is coupled to the washing unit 3. In order to most efficiently accommodate cups and glasses of various heights, respective racks 15 may be provided at different relative vertical spacings, whereby the spray arms 13 of the washing unit 3 are also accordingly spaced and positioned relative to one another. It is also possible to provide a range of selectable slide rails 14 in each service trolley 2, so that the spacing between adjacent racks 15 may be selected as needed. In this case, the spray arms 13 are also mounted in the washing unit 3 in an adjustable manner, so that different configurations can readily be provided as needed or requested by different airlines or for different types of flights, e.g. daytime or nighttime, or long-haul or short-haul flights, which may have different types of service items that need to be washed.

Near the bottom of the trolley 2, below the racks 15, a collecting basin or pan 19 is arranged, for catching and collecting any remaining amounts of beverages that spill or drip out of the glasses and cups being taken from the passengers, and also for collecting and catching the water that drips down from the glasses and cups after they have been washed. In order that the catch basin 19 conveniently catches any spills or drips of beverages as the glasses and cups are being collected, the basin 19 is preferably slidably arranged on slide rails 14 similarly to the racks 15, so that the basin 19 may be pulled out along with the racks 15. Furthermore, the collecting basin 19 is tiltable about a tilting axis 20 for draining as follows. While the trolley 2 is being used to collect the glasses and cups, and at all times when the trolley 2 is not coupled to the washing unit 3, the collecting basin 19 is in a substantially horizontal position so that the liquid collected therein does not spill out. When the trolley 2 is coupled to the washing unit 3, the collecting basin 19 preferably automatically tilts down so as to drain the collected beverage rests. One example embodiment for such automatic tilting of the collecting basin 19 is shown by dashed lines in FIG. 2, and is further evident in FIG. 3. In this embodiment, the collecting basin 19 is urged into the horizontal position by springs or the like, and as the trolley 2 is pushed into the parking bay 6 and coupled with the washing unit 3, the collecting basin 19 contacts and is pushed down along a ramp surface 18 provided on the washing unit 3. The components are so configured and dimensioned that the beverage rests collected in the collecting basin 19, as well as the wash water collected during and after the washing process, drain out of the basin 19 into the liquid collecting tank 12.

Once the service trolley 2 is coupled to the washing unit 3, as will be further described below with reference to FIG. 3, the interior of the service trolley 2 simultaneously serves as the washing chamber or housing 21, whereby the interior of the service trolley 2 is washed and dried together with the dishes and cutlery therein, during each washing process. Nonetheless, the outside of the service trolley 2 remains dry. In order to achieve this, the side 22 of the service trolley 2 that faces the washing unit 3 must be at least partially open or openable for carrying out the washing process. Namely the side 22 of the service trolley 2 may simply have an opening therein, which preferably substantially occupies the entire side 22 of the trolley 2 except for a frame rim or the like, or the side 22 of the trolley 2 may be equipped with an openable and closeable door in order to protect the clean dishes and cutlery from soiling after the washing process has been completed. The substantially closed back side 37 of the trolley 2 opposite the open side 22 has a locking hole 24 therein in which a locking handle or toggle lever 23 may be inserted and locked in order to secure the service trolley 2 to the washing unit 3, as shown in FIG. 3 and further described below.

FIG. 3 shows the dish washing apparatus with its components, the service trolley 2 and the washing unit 3, coupled or docked together with one another. In this coupled condition, the outer dimensions of the dish washing unit 1 correspond to the outer dimensions of a full-sized trolley in the present embodiment, so that the dish washing apparatus 1 can be completely housed within the standard trolley parking bay 6 within the galley 4. As the service trolley 2 is being pushed into the parking bay 6 and docked onto the washing unit 3, the spring biased collecting basin 19 is pressed down by a ramp member 18, as mentioned above. Due to the resulting tilted position of the collecting basin 19, the collected beverage rests drain out and flow into the tank 12.

The locking toggle 23, which is for example provided on a free end of one of the spray arms 13, passes through the locking hole 24 and is then toggled to lock the trolley 2 into the proper position docked and coupled with the washing unit 3. A seal 25 provided along the edge or rim of the washing unit 3 seals against the edge or rim of the open side 22 of the trolley 2 and thereby forms a sealed washing chamber 21 inside the trolley 2. The locking toggle 23 may be simultaneously embodied as a start switch for starting the washing process and may also be provided with control or indicator lamps as well as emergency switches.

During the washing process, the pump 9 pumps warm water through the filter 11 out of the tank 10 and distributes it through the nozzles 13A of the spray arms 13, so that the water sprays onto the glasses and cups. The washing process is carried out by recirculating the wash water. Thereafter, a clean water rinse cycle is carried out using fresh water provided from the water tank 8. As the water runs down from the glasses and cups, it is collected in the collecting basin 19 and then flows into the liquid tank 12, from which it then flows or is pumped to a water drain system of the aircraft. From the water drain system of the aircraft, the waste water is either dumped overboard through a drain mast 39 or the like, or it may be further filtered and otherwise prepared to be used for flushing the toilets 40 onboard the aircraft.

After the washing process has been completed, a drying process may be carried out while the service trolley 2 is still coupled to the washing unit 3, by blowing heated air through the washing chamber 21 from an optional hot air blower or ventilating apparatus 38. Alternatively, the service trolley 2 may be decoupled from the washing unit 3 immediately after carrying out the washing process, and the cleaned cups and glasses may be allowed to air dry, or the trolley may be moved to another parking bay 6 at which an air blower is provided to carry out the drying process. The cleaned and dried glasses and cups may then be stored in the service trolley 2 in the galley 4, as usual, until they are needed again, whereupon the trolley is wheeled through the cabin and the glasses and cups are taken directly from the trolley for serving beverages to the passengers. In this manner, no additional handling or effort is necessary for loading or unloading dishes, glassware or the like from the dish washing apparatus 1. Namely, the need to sort and load the dishes, cutlery, glassware and the like into the washing apparatus, remove the items from the washing apparatus after the washing process and resort them into a storage location, and then load the items from the storage location into a service trolley has been avoided.

Alternatively, the entire racks 15 carrying the cups 17 and glasses 16 may be removed from the service trolley 2 after the washing process, and may be slidingly placed into a separate storage cabinet or the like, which may be ventilated for carrying out the drying process. Hereby, the amount of handling is reduced because the entire racks 15 are moved rather than individual pieces of cutlery, dishes or glassware. This alternative can be advantageous if not enough service trolleys 2 adapted to be coupled with the washing unit 3 are available, so that the cleaned dishes must be removed from the service trolley 2 in order that the trolley 2 may be reloaded with the dirty dishes.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for washing food service utensils onboard and in combination with an aircraft, comprising a service trolley that is adapted to receive the utensils therein and that has at least one side with an opening therein, and a washing unit that is removably coupleable with said trolley on said one side thereof so as to cover said opening and form a washing chamber within said trolley bounded at said opening by said washing unit, wherein said aircraft includes an onboard galley with at least one trolley parking bay therein, and a water supply fitting and a power supply fitting provided in said trolley parking bay, wherein said washing unit is so configured and dimensioned so as to be positionable within said trolley parking bay in said aircraft, and is positioned in said trolley parking bay and is connected to said water supply fitting and said power supply fitting, and wherein said service trolley is adapted to be moved into said trolley parking bay so as to couple said service trolley with said washing unit.

2. The apparatus according to claim if further comprising a locking lever arranged to lock together said service trolley and said washing unit in a coupled state, and a seal member arranged on said service trolley or said washing unit to form a seal between said washing unit and said service trolley around said opening when said service trolley and said washing unit are locked in said coupled state by said locking lever.

3. The apparatus according to claim 2, where in said locking lever is a toggleable locking toggle arranged on said washing unit, and said trolley has a lock hole on a second side thereof opposite said one side having said opening, wherein said locking toggle can be received through said lock hole and toggled into a locked position.

4. The apparatus according to claim 1, wherein said service trolley has slide rails therein, and further comprises washing racks that are adapted to receive the utensils thereon, and that are slidably mounted on said slide rails so as to be slidable into and out of said trolley through said opening.

5. The apparatus according to claim 1, wherein said washing unit comprises a plurality of horizontally extending spray arms that respectively have spray nozzles provided thereon and that are so configured and arranged to extend into said service trolley when said service trolley and said washing unit are coupled together.

6. The apparatus according to claim 5, further comprising a locking lever mounted on a free end of one of said spray arms, wherein said service trolley has a locking hole in a second side thereof opposite said one side having said opening, and wherein said locking hole is adapted to receive said locking lever therethrough.

7. The apparatus according to claim 1, further comprising a drying air ventilation apparatus arranged at said one side of said service trolley having said opening.

8. The apparatus according to claim 1, wherein said service trolley further comprises a liquid collecting basin tiltably arranged at a bottom of said service trolley, and said washing unit further comprises a liquid collection tank at a bottom of said washing unit, and a ramp member positioned and adapted to contact and tilt said liquid collecting basin of said service trolley when said service trolley and said washing unit are coupled together so as to allow liquid to run out of said collecting basin into said liquid collection tank.

9. The apparatus according to claim 1, wherein said aircraft further comprises a waste water drain system including a drain mast extending overboard from said aircraft, and wherein said apparatus further includes a waste liquid drain that is connected through said waste water drain system to said drain mast.

10. The apparatus according to claim 1, wherein said aircraft further comprises a flush water system and a toilet connected to said flush water system, and wherein said apparatus further includes a waste liquid drain that is connected to said flush water system so that waste liquid from said apparatus can be used to flush said toilet.

11. The apparatus according to claim 1, wherein said trolley parking bay has a configuration and internal dimensions corresponding to a standard full-sized in-flight meal service trolley, wherein said washing unit occupies substantially half of a depth of said trolley parking bay, and wherein said service trolley of said apparatus has a configuration and external dimensions corresponding to a standardized half-size in-flight meal service trolley.

12. The apparatus according to claim 1, further comprising at least one flexible water hose and at least one flexible power cable that respectively have a length greater than a depth of said trolley parking bay, and that connect said washing unit respectively to said water supply fitting and said power supply fitting.

13. The apparatus according to claim 12, wherein said washing unit comprises wheels on which said washing unit may be rolled into and out of said trolley parking bay.

14. The apparatus according to claim 1, wherein said opening occupies substantially all of said side of said trolley.

15. The apparatus according to claim 1, further in combination with said food service utensils, which are selected from drinking glasses and cups.

16. The apparatus according to claim 1, further in combination with said food service utensils, which are selected from dishes and cutlery.

17. The apparatus according to claim 1, further in combination with said food service utensils, which are meal trays.

18. The apparatus according to claim 1, wherein said washing unit comprises a vertically extending module with a water pump and a first water tank therein and a plurality of water spray arms extending horizontally therefrom at several vertically spaced levels, and a base module extending horizontally from a bottom of said vertically extending module below said water spray arms, with a second water tank included in said base module.

19. A method of using said apparatus of claim 1 onboard said aircraft in which said washing unit is installed in said trolley parking bay in said galley, comprising the following steps in the following order:

a) pushing said service trolley along an aisle of said aircraft, collecting used food service utensils from passengers and placing said used utensils directly into said service trolley;

b) pushing said service trolley into said trolley parking bay and coupling said service trolley with said washing unit;

c) carrying out a washing cycle to wash said used utensils by causing said washing unit to spray water into said service trolley; and d) leaving said washed utensils in said service trolley after said washing cycle, and providing said washed utensils to passengers in said aircraft directly from said service trolley.

20. An apparatus for washing food service utensils onboard an aircraft, comprising a service trolley that is adapted to receive the utensils therein and that has at least one side with an opening therein, and a washing unit that is removably coupleable with said trolley on said one side thereof so as to cover said opening and form a washing chamber within said trolley bounded at said opening by said washing unit, wherein said washing unit is so configured and dimensioned so as to be positionable within a trolley parking bay in the aircraft, wherein said service trolley comprises a liquid collecting basin tiltably arranged at a bottom of said service trolley, and wherein said washing unit comprises a liquid collection tank at a bottom of said washing unit, and a ramp member positioned and adapted to contact and tilt said liquid collecting basin of said service trolley when said service trolley and said washing unit are coupled together so as to allow liquid to run out of said collecting basin into said liquid collection tank.

* * * * *

UNITED STATES PATENT AND TRADEMARK OFFICE
CERTIFICATE OF CORRECTION

PATENT NO. : 6,055,996

DATED : May 2, 2000

INVENTOR(S) : Sprenger et al.

It is certified that error appears in the above-identified patent and that said Letters Patent is hereby corrected as shown below:

Col. 4, line 63, after "as", replace "de scribed" by --described--;

Col. 8, line 4, afer "claim", replace "if" by --1,--;

line 12, after "claim 2,", replace "where in" by --wherein--.

Signed and Sealed this

Third Day of April, 2001

*Attest:*

NICHOLAS P. GODICI

*Attesting Officer*     *Acting Director of the United States Patent and Trademark Office*